United States Patent [19]
Hohner et al.

[11] Patent Number: 6,107,530
[45] Date of Patent: Aug. 22, 2000

[54] USE OF POLYOLEFIN WAXES IN SOLVENT PASTES

[75] Inventors: Gerd Hohner, Gersthofen; Hans-Friedrich Herrmann, Gross-Gerau, both of Germany

[73] Assignee: Clariant GmbH, Frankfurt, Germany

[21] Appl. No.: 09/191,565

[22] Filed: Nov. 13, 1998

[30] Foreign Application Priority Data

Nov. 15, 1997 [DE] Germany .......................... 197 50 663

[51] Int. Cl.$^7$ ................................. C10L 1/16; C09G 1/08
[52] U.S. Cl. ............................ 585/9; 585/520; 585/946; 106/10
[58] Field of Search ................ 585/9, 946, 520; 526/901; 106/10

[56] References Cited

U.S. PATENT DOCUMENTS

| | | | |
|---|---|---|---|
| 3,424,599 | 1/1969 | Kaupp et al. | 106/10 |
| 4,914,253 | 4/1990 | Chang | 526/901 X |
| 4,962,262 | 10/1990 | Winter et al. | 585/512 |
| 5,023,388 | 6/1991 | Luker | 526/901 X |
| 5,723,705 | 3/1998 | Herrmann et al. | 585/9 |

FOREIGN PATENT DOCUMENTS

| | | |
|---|---|---|
| 0321851 | 6/1989 | European Pat. Off. . |
| 0321852 | 6/1989 | European Pat. Off. . |
| 0571882 | 12/1993 | European Pat. Off. . |
| 0632063 | 1/1995 | European Pat. Off. . |
| 0719802 | 7/1996 | European Pat. Off. . |
| 0890619 | 1/1999 | European Pat. Off. . |
| 0030412 | 3/1981 | Japan .......................... 585/9 |

OTHER PUBLICATIONS

EPO Search Report.
Ullmann's Encyclopedia of Industrial Chemistry, 5$^{th}$ Ed. vol. A28, pp 108, 153 & 156.
"Messung der Festigkeit von Wachs–Lösungsmittelpasten," Seife–Öle–Fette Wachse, No. 20/1957, p. 595.
Derwent Patent Family Report and/or Abstracts.

*Primary Examiner*—Fred Teskin
*Attorney, Agent, or Firm*—Susan S. Jackson; Scott E. Hanf

[57] ABSTRACT

The present invention relates to the use of polyolefin waxes synthesized by means of metallocene catalysts for the preparation of solvent-containing pastes. The pastes prepared in this way have a significantly higher paste hardness and an improved heat stability.

8 Claims, No Drawings

USE OF POLYOLEFIN WAXES IN SOLVENT PASTES

BACKGROUND OF THE INVENTION

Polyolefin waxes, in particular polyethylene waxes, are widely used as formulation components for the preparation of solvent-containing pastes for use, for example, in the care of floorings, automobiles and shoes (cf. Ullmann's Encyclopedia of Industrial Chemistry, 5th Edition, Vol. A 28, pages 108, 153, 156, Weinheim 1996). Wax pastes are formed by allowing hot wax solutions in organic solvents to cool. The paste form enables easy application of the waxes: after mechanical spreading of the paste on the surface to be treated, the solvent evaporates and a protective, preserving or otherwise active wax film remains.

For formulation of pastes comprising polyolefin wax, further waxes, such as, for example, block paraffins, microwaxes and refined carnauba or partly hydrolyzed and/or nonhydrolyzed montan waxes, and furthermore auxiliaries for fine adjustment, such as metal stearates, are as a rule employed. Hydrocarbons, such as, for example, aromatic-containing or aromatic-free benzines or turpentine oil, are usually used as the solvent.

A quality-determining property of such pastes is, in addition to the nature of the surface (gloss) and heat stability, their consistency (in this context cf.: Seifen-Öle-Fette-Wachse, No. 20/1957, page 595). The measurement parameter for the latter is as a rule the so-called paste hardeners, with which the stability of the paste body is determined. The quality criterion here is the paste hardness both of the pure wax ("solvent uptake") and of mixtures formulated in practice with further wax components which form pastes less readily ("paste-forming capacity"). The dependence of the paste hardness on the temperature and storage time is also of decisive importance for the evaluation.

Polyolefin wax components which are used in the formulation of pastes are primarily polyethylene waxes, in particular those which contain side chain branchings. Such waxes can be prepared by thermal degradation of branched highly polymeric polyethylene plastics or by direct polymerization of ethylene. Possible polymerization processes are, for example, high pressure technologies, in which ethylene is converted by free radicals at high pressures and temperatures into branched waxes, and in addition low pressure or Ziegler processes, in which ethylene is polymerized with the aid of organometallic catalysts at comparatively low pressures and temperatures. If the low pressure process is used, the branchings are as a rule introduced into the polyethylene chain by copolymerization of the ethylene with larger or smaller proportions of longer-chain olefin monomers, for example propene or 1-butene.

A procedure in which metallocene compounds are used as organometallic catalysts has recently been disclosed as a variant of the low pressure process. These compounds comprise atoms of titanium, zirconium or hafnium as the active species and are as a rule employed in combination with cocatalysts, for example organoaluminum or boron compounds, preferably aluminoxane compounds. If required, the polymerization is carried out in the presence of hydrogen as a molecular weight regulator. Metallocene processes are distinguished by the fact that waxes having a narrower molecular weight distribution, more uniform incorporation of comonomers, lower melting points and higher catalyst yields can be obtained compared with the older Ziegler technology.

Corresponding polymerization processes for the preparation of polyolefin waxes which operate with metallocene catalysts are described, for example, in EP-A-571882.

SUMMARY OF THE INVENTION

The invention relates to polyolefin waxes which are particularly suitable for the preparation of solvent-containing wax pastes.

It has now been found that polyolefin waxes which have been prepared with the aid of metallocene catalysts are particularly advantageously suitable for use in paste recipes. The hardness of the pastes prepared from such waxes is thus significantly increased compared with conventional polyethylene waxes. This applies both to the solvent uptake and to the paste-forming capacity as a mixture with other waxes. Such pastes also have improved heat stabilities. Since hitherto no knowledge existed regarding the relationship between the molecular structure of polyethylene waxes and their suitability for paste formation, the results found were completely surprising.

The invention therefore relates to the use of polyolefin waxes synthesized by means of metallocene catalysts for the preparation of solvent-containing pastes of improved quality.

DESCRIPTION OF THE PREFERRED EMBODIMENTS

Possible polyolefin waxes are homopolymers of ethylene or copolymers of ethylene with one or more 1-olefins. 1-Olefins which are employed are linear or branched olefins having 3–18 carbon atoms, preferably 3–6 carbon atoms. Examples of these are propene, 1-butene, 1-hexene, 1-octene or 1-octadecene, and furthermore styrene. Copolymers of ethylene with propene or 1-butene are preferred. The copolymers comprise 70–99.9, preferably 80–99, % by weight of ethylene.

Polyolefin waxes having a drop point of between 90 and 130° C., preferably between 100 and 120° C., a melt viscosity at 140° C. of between 10 and 10,000 mPa.s, preferably between 50 and 5000 mPa.s, and a density at 20° C. of between 0.89 and 0.96 $cm^3/g$, preferably between 0.91 and 0.94 $cm^3/g$, are particularly suitable.

Metallocene catalysts for the preparation of the polyolefin waxes are chiral or on-chiral transition metal complexes of the formula M1Lx. The transition metal compound M1Lx contains at least one central metal atom M1, onto which at least one π-ligand L, for example a cyclopentadienyl ligand, is bonded. Substituents, such as, for example, halogen, alkyl, alkoxy or alkyl groups, can furthermore be bonded to the central metal atom M1. M1 is preferably an element of main group III, IV, V or VI of the Periodic Table of the Elements, such as Ti, Zr or Hf. Cyclopentadienyl ligand is to be understood as meaning unsubstituted cyclopentadienyl radicals and substituted cyclopentadienyl radicals, such as methylcyclopentadienyl, indenyl, 2-methylindenyl, 2-methylbenzindenyl, 2-methyl-4-phenylindenyl, tetrahydroindenyl or octahydrofluorenyl radicals. The π-ligands can be bridged or non-bridged, single and multiple bridges—also via ring systems—being possible. The term metallocene also includes compounds having more than one metallocene fragment, so-called polynuclear metallocenes. These can have any desired substitution pattern and bridge variants. The individual metallocene fragments of such polynuclear metallocenes can be either identical or different from one another. Examples of such polynuclear metallocenes are described, for example, in EP-A-632 063.

Examples of general structural formulae of metallocenes and of activation thereof with a cocatalyst are given, inter alia, in EP-A-571 882.

The invention is illustrated by the following examples, without being limited to these examples.

The melt viscosities of the waxes described below were determined using a rotary viscometer in accordance with DGF-M-III 8 (57), the drop points were determined in accordance with DGF-M-III 3 (75) (standards of the German Association of Fat Science) and the densities were determined in accordance with DIN 53479. The paste hardnesses were measured by a process described in Seifen-Öle-Fette-Wachse, No. 20/1957, page 595.

EXAMPLES

The following polyethylene waxes were employed for testing in paste recipes:

TABLE 1

|  | Preparation process/ catalyst | Melt viscosity/ 140° C. mPa.s | Drop point ° C. | Density g/cm³ |
|---|---|---|---|---|
| Wax sample 1 | Low pressure polymerization/ Metallocene | 680 | 107 | 0.930 |
| Wax sample 2 | Low pressure polymerization/ Metallocene | 610 | 109 | 0.935 |
| Wax sample 3 | Low pressure polymerization/ Metallocene | 540 | 111 | 0.939 |
| Wax sample 4 | Low pressure polymerization/ Metallocene | 660 | 109 | 0.932 |
| Wax sample 5 | Low pressure polymerization/ Metallocene | 520 | 110 | 0.932 |
| Wax sample 6 | Low pressure polymerization/ Metallocene | 610 | 108 | 0.935 |
| Comparison sample 1 | Ziegler low pressure polymerization | 600 | 119 | 0.930 |
| Comparison sample 2 | High pressure polymerization | 380 | 106 | 0.925 |
| Comparison sample 3 | High pressure polymerization | 650 | 107 | 0.926 |
| Comparison sample 4 | High pressure polymerization | 350 | 105 | 0.930 |

Samples 1 to 6 were prepared by ethylene/propylene copolymerization with the aid of metallocene catalysts in accordance with the working instructions described in EP-A-571882.

Examples 1, 2; Comparison Examples 1, 2: Solvent Uptake 20 parts of test wax are melted and brought to a temperature of about 130° C. 80 parts of test benzine (boiling range 140–180° C.) heated to 100° C. are poured into the wax melt, while stirring. The wax solution is allowed to cool, with continued stirring, to a temperature 2° above the solidification point of the test wax (measured on a rotating thermometer in accordance with DIN 51556) and the mixture is poured into a tin can in a refrigerator with bottom cooling at 16° C. The mixture is allowed to cool for 20 minutes and the paste hardness is measured after storage at 23° C. for 24 hours.

TABLE 2

| Test wax | Example 1 Wax sample 1 (metallocene wax) | Example 2 Wax sample 2 (metallocene wax) | Comparison Example 1 Comparison sample 1 (Ziegler wax) | Comparison Example 2 Comparison sample 2 (high pressure wax) |
|---|---|---|---|---|
| Paste hardness (g/cm²) |  |  |  |  |
| Measured at 20° C. | 2890 | 1750 | 1240 | 770 |
| Measured after storage (1 day at 40° C.) | 1660 | 1040 | 510 | 350 |

The examples show the superiority of metallocene waxes over products prepared conventionally by low or high pressure polymerization. This applies both to the paste hardnesses measured at normal temperature and to those measured after storage at elevated temperature.

Examples 3, 4, Comparison Examples 3, 4: Testing of the Paste Properties in a Recipe in Practice

TABLE 3

Recipe (data in % by weight):

| Constituent | % by wt. |
|---|---|
| Hoechst Wax X 55 (partly hydrolyzed ester wax based on montan wax) | 8.5 |
| Hoechst Wax KSL (ester wax based on montan wax) | 1.5 |
| Hoechst Wax RT (ester wax based on montan wax) | 1.0 |
| Block paraffin 52/54 | 20.0 |
| Test wax | 2.0 |
| Ca stearate | 3.0 |
| Test benzine | 64.0 |
| | 100.0 |

The procedure for the preparation of the pastes is analogous to that described for Examples 1 and 2.

TABLE 4

Results:

| Test wax Surface | Example 3 Wax sample 1 (metallocene wax) Mirror gloss | Example 4 Wax sample 2 (metallocene wax) High gloss | Comparison Example 3 Comparison-sample 1 (Ziegler wax) High gloss | Comparison Example 4 Comparison sample 3 (high pressure wax) High gloss |
|---|---|---|---|---|
| Paste hardness (g/cm$^2$) measured at 20° C. | 2490 | 2070 | 1770 | 1850 |
| measured after storage (1 day at 40° C.) | 320 | 270 | 200 | 220 |

Examples 5, 6, Comparison Example 5: Testing of the Paste Properties in a Shoecream Recipe of Hard Formulation

TABLE 5

Recipe (data in % by weight):

| Constituent | % by wt. |
|---|---|
| Hoechst Wax O (partly hydrolyzed ester wax based on montan wax) | 9.0 |
| Hoechst Wax E (ester wax based on montan wax) | 3.0 |
| Hoechst Wax LP (acid wax based on montan wax) | 1.8 |
| Plastic microwax (ozokerite) | 1.8 |
| Block paraffin 60/62 | 9.0 |
| Test wax | 1.8 |
| Ca stearate | 1.5 |
| Test benzine | 72.1 |
| | 100.0 |

The procedure for the preparation of the pastes is analogous to that described for Examples 1 and 2.

TABLE 6

Results:

| Test wax | Example 5 Wax sample 3 (metallocene wax) | Example 6 Wax sample 4 (metallocene wax) | Comparison Example 5 Comparison sample 1 (Ziegler wax) |
|---|---|---|---|
| Paste hardness (g/cm$^2$) measured at 20° C. measured after storage: | 2090 | 2335 | 1308 |
| 2 hours/30° C. | 790 | 997 | 509 |
| 2 hours/40° C. | 300 | 385 | 183 |

Examples 7–10, Comparison Examples 6,7: Testing of the Paste Properties in an Inexpensive Floor Wax Recipe

TABLE 7

| Recipe (data in % by weight) | |
| --- | --- |
| Constituents | % by wt. |
| Hoechst Wax OP (partly hydrolyzed ester wax based on montan wax) | 1.5 |
| Test wax | 3.5 |
| Hydrogenated castor oil | 1.0 |
| Paraffin 60/62 | 19.0 |
| Test benzine | 75.0 |
| | 100.0 |

The procedure for the preparation of the pastes is analogous to that described for Examples 1 and 2.

TABLE 8

| | Example 7 | Example 8 | Example 9 | Example 10 | Comparison Example 6 | Comparison Example 7 |
| --- | --- | --- | --- | --- | --- | --- |
| Test wax | Wax sample 3 (metallocene wax) | Wax sample 4 (metallocene wax) | Wax sample 5 (metallocene wax) | Wax sample 6 (metallocene wax) | Comparison sample 1 (Ziegler wax) | Comparison sample 4 (high pressure wax) |
| Paste hardness (g/cm$^2$) | | | | | | |
| Measured at 20° C. | 3090 | 2770 | 2105 | 1753 | 1466 | 1534 |
| Measured after storage: | | | | | | |
| 2 hours/30° C. | 1236 | 1320 | 932 | 740 | 570 | 805 |
| 2 hours/40° C. | 300 | 188 | 154 | 250 | <120 | <120 |

What is claimed is:

1. A process for preparing a solvent-containing paste comprising incorporating a solvent into a polyolefin wax synthesized by means of a metallocene catalyst.

2. The process as claimed in claim 1, wherein an ethylene copolymer wax comprising 0.1–30% by weight of one or more 1-olefins having a chain length of 3 to 18 carbon atoms is employed.

3. The process as claimed in claim 2, wherein the 1-olefins have a chain length of 3 to 6 carbon atoms.

4. The process as claimed in claim 2, wherein a copolymer wax of ethylene with 0.1–30% by weight of propene or 1-butene is employed.

5. The process as claimed in claim 1, wherein the polyolefin wax has a drop point of between 90 and 130° C. and a melt viscosity at 140° C. of between 10 and 10,000 mPa.s.

6. A solvent-containing wax paste comprising a polyolefin wax which has been synthesized by means of a metallocene catalyst.

7. The wax paste as claimed in claim 6, further comprising a block paraffin, microwax or refined carnauba or partly hydrolyzed or non-hydrolyzed montan wax and auxiliaries for fine adjustment.

8. The wax paste as claimed in claim 6, which comprises an aromatic-containing or aromatic-free benzine or turpentine oil.

* * * * *